United States Patent
Nozaki

(10) Patent No.: US 6,820,372 B2
(45) Date of Patent: Nov. 23, 2004

(54) SEALING STRUCTURE OF MOTOR VEHICLE

(75) Inventor: Masahiro Nozaki, Nishikasugai-gun (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/093,893

(22) Filed: Mar. 11, 2002

(65) Prior Publication Data

US 2002/0124472 A1 Sep. 12, 2002

(30) Foreign Application Priority Data

Mar. 12, 2001 (JP) ............................................. 2001-067965

(51) Int. Cl.$^7$ ............................................................. E06B 7/22
(52) U.S. Cl. ............................................ 49/498.1; 49/492.1
(58) Field of Search ........................... 49/475.1, 492.1, 49/493.1, 498.1

(56) References Cited

U.S. PATENT DOCUMENTS

| | | | |
|---|---|---|---|
| 3,106,422 A | * 10/1963 | White | 49/498.1 |
| 4,858,385 A | * 8/1989 | Bright | 49/492.1 |
| 5,207,029 A | 5/1993 | Nozaki et al. | |
| 5,449,544 A | 9/1995 | Ogawa et al. | |
| 5,634,644 A | * 6/1997 | Guillon | 49/492.1 |
| 5,918,421 A | * 7/1999 | Nozaki | 49/492.1 |
| 5,950,366 A | * 9/1999 | Uhlmeyer | 49/484.1 |
| 6,112,468 A | * 9/2000 | Aritake et al. | 49/475.1 |
| 6,138,415 A | * 10/2000 | Ohtsu et al. | 49/490.1 |
| 6,357,182 B1 | * 3/2002 | Nozaki | 49/498.1 |
| 6,397,525 B1 | * 6/2002 | Ishibashi et al. | 49/484.1 |
| 6,405,489 B1 | * 6/2002 | Miura | 49/479.1 |
| 6,442,902 B1 | * 9/2002 | Van Den Oord | 49/498.1 |

FOREIGN PATENT DOCUMENTS

DE 4409326 A1 3/1994

* cited by examiner

Primary Examiner—Jerry Redman
(74) Attorney, Agent, or Firm—Posz & Bethards, PLC

(57) ABSTRACT

A sealing structure includes a door opening portion formed around a door opening in a vehicle body, and a weather strip secured to the door opening portion. The weather strip has a base portion and a tubular seal portion which is pushed by a vehicle door when the door opening is closed. End edges of an outer body panel and an inner body panel which compose the door opening portion are placed on and joined to each other, thereby forming a flat joint. The outer body panel has a concave surface from the outside of the flat joint to a side surface of the vehicle body. The concave surface is composed of a first surface which bends from the outside of the flat joint into an L-shaped configuration and extends outwardly of the door opening portion, and a second surface which bends from the first surface into an L-shaped configuration and extends towards the side surface of the vehicle body. The base portion of the weather strip has an L-shaped cross-section in conformity with the flat joint and the first surface, and the tubular seal portion of the weather strip has an arc-shaped seal wall expanding from a part of the base portion, which faces the first surface, and fills a space defined by the concave surface.

7 Claims, 4 Drawing Sheets

SEALING STRUCTURE OF MOTOR VEHICLE

CROSS-REFERENCE OF RELATED APPLICATION

This application is related to and claims priority from Japanese patent application No. 2001-067965, incorporated herein by reference.

BACKGROUND OF THE INVENTION

1. Field of the Invention

The present invention relates to a sealing structure between a door opening portion around a door opening in a vehicle body, and a door for closing and opening the door opening.

2. Description of Related Art

As shown in FIG. 1, a weather strip 10 is attached along a door opening portion 12 of a vehicle body. When a vehicle door D is closed, the weather strip 10 seals between a periphery of the vehicle door D and the door opening portion 12 of the vehicle body.

FIG. 2 is a cross-sectional view of a conventional sealing structure in the door opening portion 12 along a roof-side of a vehicle body, which is taken along the line of Y—Y of FIG. 1. The door opening portion 12 is composed of an inner body panel 16 and an outer body panel 18. End edge of the inner body panel 16 and the outer body panel 18 are joined to each other to form a flange 14. The flange 14 projects into a door opening from the door opening portion 12 at approximately right angles thereto. The weather strip 10 includes a base portion 20 having a U-shaped cross-section, and a tubular seal portion 22 which forms on one of side walls of the base portion 20. The weather strip 10 thus arranged is attached along the door opening portion 12 such that the base portion 20 is fitted on the flange 14 with the seal portion 22 located outside the flange 14, and lips 24 which inwardly project from facing side walls of the base portion 20 hold the flange 14. When the vehicle door D is closed, an inside surface of a periphery of the vehicle door D pushes the seal portion 22 of the weather strip 10.

Flanges are also formed in body pillar parts and a rocker part which extend around a door opening, so as to be continuous with the flange 14 along the roof-side part of the vehicle body. These flanges are formed by joining end edges of an inner body panel and an outer body panel of the body pillar parts and the rocker part to each other, similarly to the flange 14. The weather strip 10 is continuously attached to these flanges.

The conventional sealing structure thus arranged, however, has the following problem. Namely, the flange projects from the door opening portion into the door opening, and the opening area of the door opening decreases by the area corresponding to at least the height of the flange.

SUMMARY OF THE INVENTION

Accordingly, it is an object of the present invention to provide a sealing structure in a door opening portion of a vehicle body, which is capable of increasing an opening area of a door opening, and ensuring sufficient sealing properties.

The sealing structure of the present invention includes a door opening portion formed around a door opening in a vehicle body, and a weather strip having a base portion which is secured to the door opening portion, and a tubular seal portion which is pushed by a vehicle door when the door opening is closed.

The door opening portion is composed of an outer body panel and an inner body panel. An end edge of the outer body panel is placed on and joined to an end edge of the inner body panel such that the outer body panel is located on the side of the door opening, thereby forming a flat joint. A concave surface is formed in the outer body panel from the outside of the flat joint thereof to a side surface of a vehicle body.

The base portion of the weather strip has a configuration which is in conformity with the outer body panel from the flat joint to the concave surface thereof, and is secured to the outer body panel. The tubular seal portion of the weather strip has a configuration which forms on the base portion and fills a space defined by the concave surface.

In a preferred embodiment, the concave surface formed in the outer body panel is composed of a first surface which bends from the outside of the flat joint into an L-shaped configuration and extends outwardly of the door opening portion, and a second surface which bends from the first surface into an L-shaped configuration and extends towards the side surface of the vehicle body. The base portion of the weather strip has an L-shaped cross-section in conformity with the flat joint and the first surface of the concave surface, and the tubular seal portion of the weather strip has an arc-shaped seal wall forming on a part of the base portion, which faces the first surface of the concave surface of the outer body panel.

With the sealing structure in accordance with the present invention, the door opening portion is not provided with any flange, and is formed flat. And the base portion of the weather strip is secured along the flat door opening portion. Consequently, the opening area of the door opening can be enlarged, as compared to the conventional sealing structure.

Other objects, features, and characteristics of the present invention will become apparent upon consideration of the following description and the appended claims with reference to the accompanying drawings, all of which form a part of this specification.

DETAILED DESCRIPTION OF THE PREFERRED EMBODIMENTS

Figure 1:
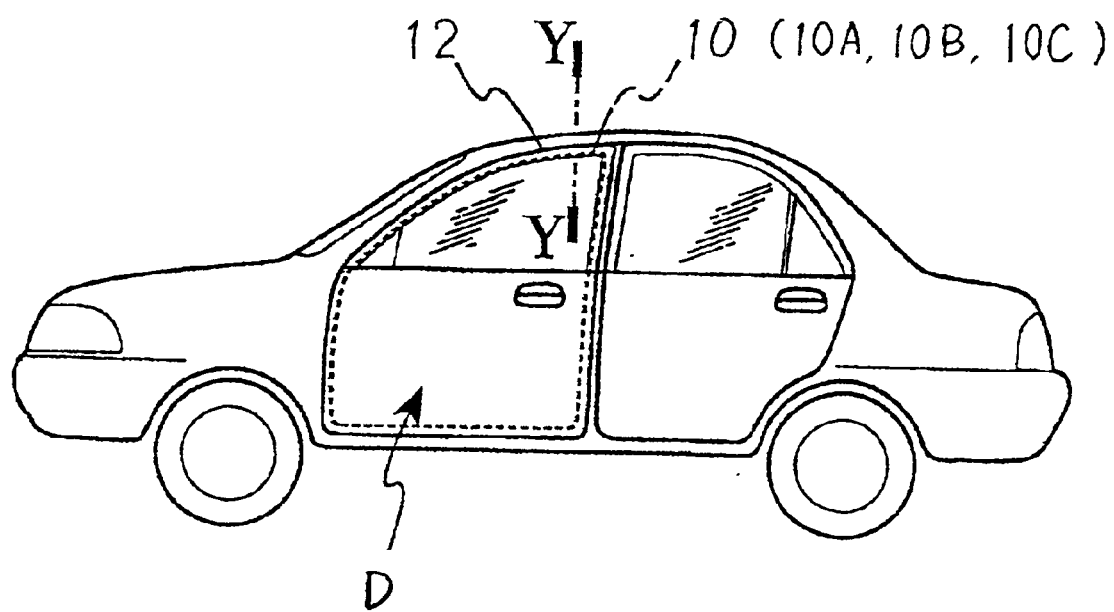
FIG. 1 is a side view of a motor vehicle.
Figure 2:
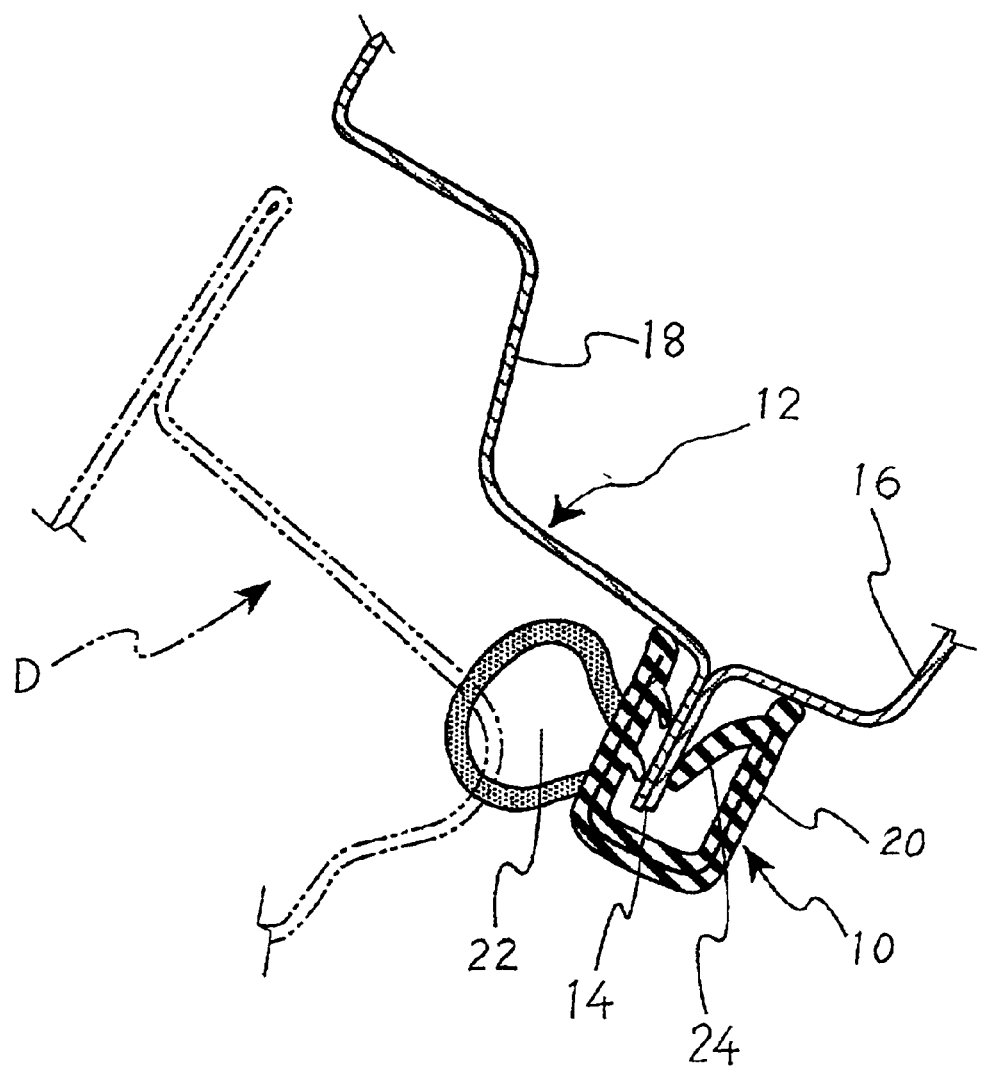
FIG. 2 is a cross-sectional view of a conventional sealing structure, which is taken along the line Y—Y of FIG. 1.
Figure 3:
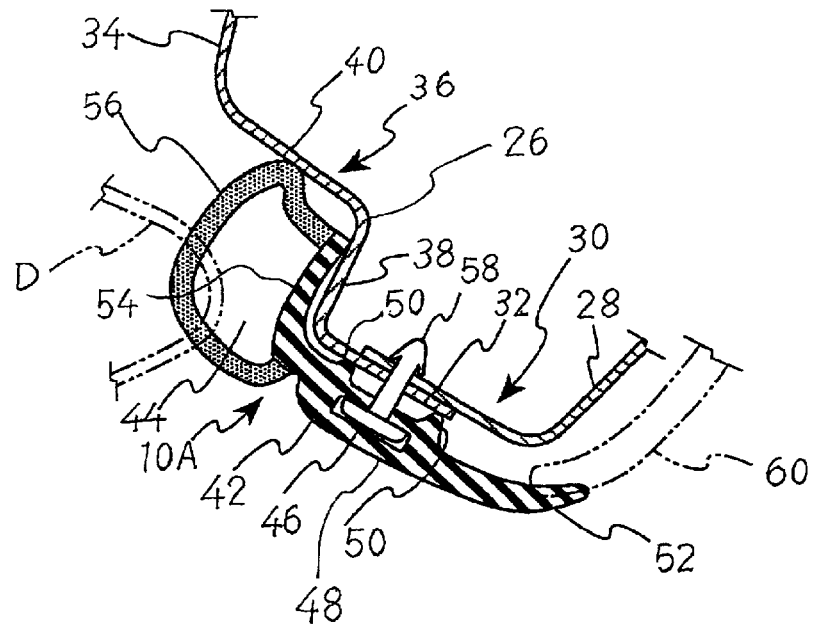
FIG. 3 is a cross-sectional view of one embodiment of a sealing structure in accordance with the present invention, which is taken along the line Y—Y of FIG. 1.

FIG. 3 illustrates a first embodiment of the present invention. As shown, an end edge of an outer body panel 26 is placed on an end edge of an inner body panel 28 with the outer body panel 26 located on the side of a door opening, and they are joined to each other by spot-welding, thereby forming a flat joint 32 in a door opening portion 30 of a vehicle body.

The outer body panel 26 bends from the outside of the flat joint 32 into a generally L-shaped configuration, and extends outwardly of the door opening portion. Then, the outer body panel 26 further bends into a generally L-shaped configuration, and extends towards a side surface 34 of a roof-side part of the vehicle body, whereby a concave surface 36 is formed by a first surface 38 and a second surface 40 of the outer body panel 26.

A weather strip 10A is composed of EPDM rubber, and integrally formed by extrusion. The weather strip 10A has a plate-like configuration, and includes a base portion 42 and a tubular seal portion 44. The base portion 42 has a generally L-shaped cross-section which is in conformity with the outer body panel 26 from the flat joint 32 to the first surface 38. A cavity 46 is formed in an inner part 48 of the base portion 42, which faces the flat joint 32, and clips 58 are mounted in the cavity 46 at predetermined intervals in a longitudinal direction of the base portion 42. Two longitudinal ribs 50 project from the inner part 48 of the base portion 42 for contacting the flat joint 32. A lip 52 projects inwardly from the base portion 42. An outer part 54 of the base portion 42 extends in conformity with the first surface 38 of the concave surface 36. The base portion 42 thus arranged is composed of EPDM solid rubber.

A tubular seal portion 44 is integrally formed with the outer part 54 of the base portion 42. A seal wall 56 of the tubular seal portion 44 is composed of EPDM sponge rubber, and forms into an arc-shaped cross-section. One side end of the seal wall 56 is connected to about a corner of the base portion 42 while the other side end of the seal wall 56 is connected to an end of the outer part 54 of the base portion 42. And the tubular seal portion 44 is arranged such that the height thereof from the outer part 54 of the base portion 42 is substantially identical to that of the side face 34 of the roof-side part of the vehicle body, and such that a surface of the tubular seal portion 44, which faces the door opening, is substantially flush with a surface of the inner part 48 of the base portion 42.

The weather strip 10A thus arranged is secured to the door opening portion 30 of the vehicle body by press-fitting the clips 58 mounted in the base portion 42 into clip holes formed in the flat joint 32 of the outer body panel 26 and the inner body panel 28.

The L-shaped base portion 42 bends greatly, as compared to the corresponding part of the L-shaped outer body panel 40. Accordingly, when the inner part 48 of the base portion 42 is secured to the flat joint 32 with clips 58, the outer part 54 of the base portion 42 comes into pressure contact with the first surface 38 of the concave surface 36 of the outer body panel 26. The tubular seal portion 44 projects and fills a space defined by the concave surface 36, and an angular part formed in the seal wall 56 abuts the second surface 40 of the concave surface 36 of the outer body panel 26. An end of the lip 52 of the base portion 42 presses a garnish 60 which covers the inner body panel 28 from the outside thereof.

When the vehicle door D is closed, an inside surface of the periphery of the vehicle door D pushes the tubular seal portion 44 of the weather strip 10A to seal between the door opening portion 30 and the vehicle door D. With the present sealing structure, the outer body panel 26 and the inner body panel 28 are joined with the flat joint 32, and the base portion 42 can be much lower than the conventional U-shaped base portion. Flat joints are also formed in front and rear pillar parts and a rocker part around a door opening so as to be continuous with the flat joint 32 along the roof-side part of the vehicle body. These flat joints are formed by joining end edges of an inner body panel and an outer body panel of the front and rear pillar parts and the rocker part to each other, similarly to the flat joint 32. A concave surface is formed in respective outer body panels continuously with the concave surface 36, and the weather strip 10A is continuously attached to the front and rear pillar parts and the rocker part with the above-described attaching structure.

Accordingly, when the weather strip 10A is attached along the door opening portion 30, the door opening can be enlarged along a diameter thereof by about 100 mm without decreasing the strength of the door opening portion 30, as compared to the cases where weather strips are attached to projecting flanges. In addition, since the L-shaped base portion 42 is press-fitted on the L-shaped outer body panel 26 upon securing the weather strip 10A to the door opening portion 30, the weather strip 10A can be attached to the vehicle body securely.

Figure 4:
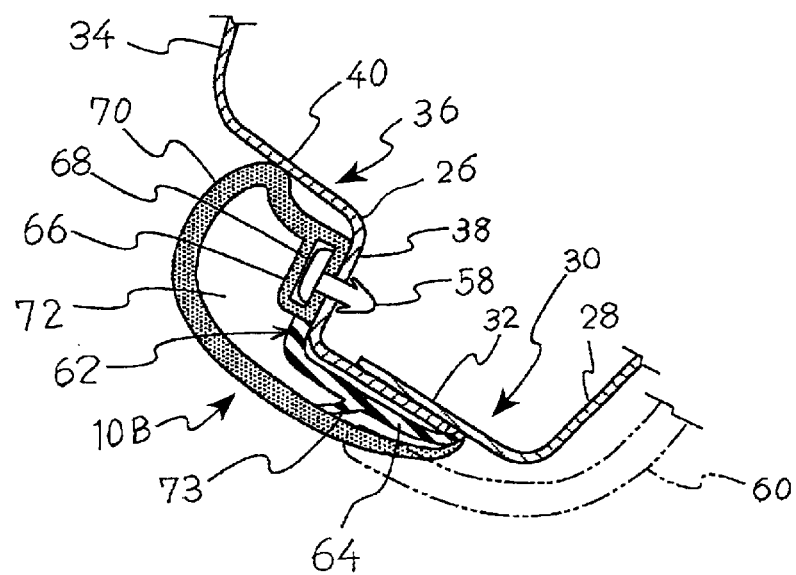
FIG. 4 is a cross-sectional view of another embodiment of a sealing structure in accordance with the present invention, which is taken along the line Y—Y of FIG. 1.

FIG. 4 illustrates a second embodiment of the present invention. As shown, the arrangement of the door opening portion of the vehicle body is substantially identical to that of the first embodiment. Accordingly, explanations thereof will be omitted.

In the present embodiment, a base portion 62 of a weather strip 10B has a generally L-shaped cross-section which is in conformity with the outer body panel 26 from the flat joint 32 to the first surface 38 thereof. An inner part 64 of the base portion 62, which faces the flat joint 32 and a corner of the outer body panel 26, is composed of EPDM solid rubber while an outer part 66 of the base portion 62, which faces the first surface 38 of the concave surface 36 is composed of EPDM sponge rubber, and has a cavity 68 therein for mounting clips 58. One side end of a seal wall 70 of a tubular seal portion 72 is connected to an inside end of the base portion 62 while the other side end of the seal wall 70 is connected to an outside end of the outer part 66 of the base portion 62. The seal wall 70 extends along the inner part 64 of the base portion 62, and expands over the outer part 66 thereof into an arc-shaped cross-section. The inner part 64 of the base portion 62 is connected to a facing surface of the seal wall 70 with a bridge 73 which is integrally formed with the base portion 62.

Upon attaching the base portion 62, the outer part 66 which is composed of sponge rubber and provided with the cavity 68 is secured to the first surface 38 of the concave surface 36 with clips 58. An inside end of the seal wall 70 is pressed by a garnish 60 which covers the inner body panel 28. With this arrangement, the base portion 62 is pressed against the flat joint 32 via the bridge 73.

The sealing structure of the second embodiment achieves operational advantages substantially identical to those of the first embodiment.

Figure 5:
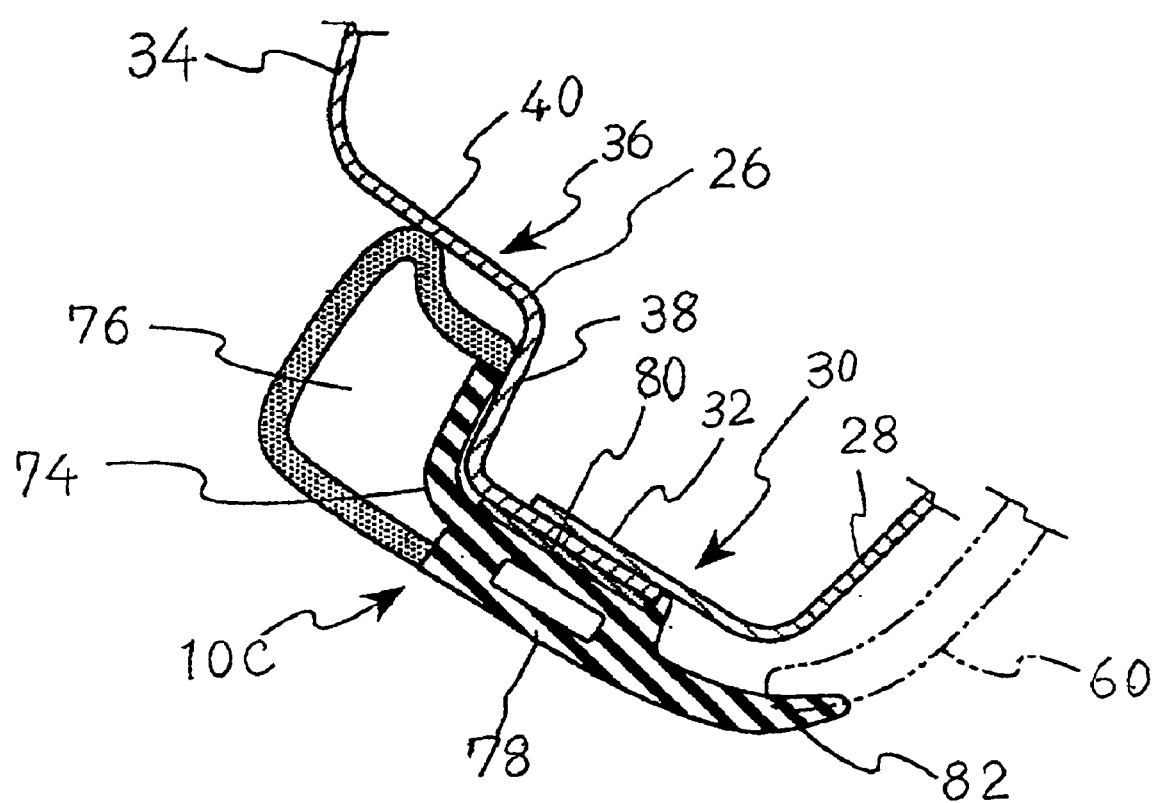
FIG. 5 is a cross-sectional view of a still another embodiment of a sealing structure in accordance with the present invention, which is taken along the line Y—Y of FIG. 1.

FIG. 5 illustrates a third embodiment of the present invention. As shown, the arrangement of the door opening portion 30 composed of the outer body panel 26 and the inner body panel 28 is substantially identical to that of the first embodiment. Accordingly, explanation thereof will be omitted.

A weather strip 10C has a base portion 74 and a tubular seal portion 76, each having a substantially identical arrangement to that of the first embodiment.

In the present embodiment, an inner part 78 of the base portion 74 is bonded to a facing outer body panel 26 from the flat joint 32 to a corner thereof with a double-sided adhesive tape 80. An end of a lip 82 of the base portion 74 presses a garnish 60 from the outside thereof.

The sealing structure of the third embodiment achieves operational advantages substantially identical to those of the first and second embodiments. In addition, it is unnecessary to mount clips in the weather strip 10C, and to form clip holes in the door opening portion 30.

In the preceding embodiments, weather strips are composed of rubber. Instead, weather strips may be composed of rubber-like elastic material such as thermoplastic elastomer. In the preceding embodiments, the sealing structures are applied between vehicle doors and door opening portions of a vehicle body. The present invention is not limited to these sealing structures. The present invention is also applicable to the sealing structures around other openings of a vehicle body, such as rear door openings, trunk room openings, and sun roof openings.

With the present invention, end edges of an inner body panel and an outer body panel for composing a door opening portion of a vehicle body are joined to each other to form a flat joint, and a weather strip is secured to the door opening portion with a base portion thereof placed on the flat joint such that a tubular seal portion thereof is accommodated in a space defined by a concave surface of the outer body panel. Accordingly, the height of the weather strip projecting into the door opening can be reduced greatly, and consequently, the opening area of the door opening can be enlarged, as compared to that in conventional sealing structures. This results in drivers and passengers can get on and off motor vehicles more easily, and baggage can be loaded and unloaded more conveniently. In addition, the weather strip is attached with the L-shaped base portion fitted on the L-shaped corner of the door opening portion, between the flat joint and the concave surface of the outer body panel, and consequently, the weather strip can be attached securely.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A sealing structure for sealing around a door opening of a vehicle against a periphery of a vehicle door, comprising:

a door opening portion formed around the door opening in a vehicle body, which is closed and opened by the vehicle door, said door opening portion being composed of an outer body panel and an inner body panel, an end edge of said outer body panel being placed on and joined to an end edge of said inner body panel with said outer body panel located on the side of said door opening, thereby forming a flat joint, said outer body panel having a concave surface which is composed of a first surface and a second surface, said first surface bending from said outside of said flat joint into an L-shaped configuration and extending outwardly of said door opening portion, and said second surface bending from said first surface into an L-shaped configuration and extending towards said side surface of said vehicle body; and a weather strip having a base portion which is secured to said outer body panel of said door opening portion of said vehicle body, and a tubular seal portion which is pushed by the periphery of the vehicle door when said door opening is closed, said base portion having an L-shaped cross-section which conforms to said flat joint and said first surface of said concave surface, and being composed of an inner part which faces said flat joint, and an outer part which faces said first surface of said concave surface of said outer body panel, a seal wall which expands from said outer part of said base portion and fills a space defined by said concave surface, thereby sealing between said door opening portion of said vehicle body and the periphery of said vehicle door with said weather strip secured to said door opening portion.

2. A sealing structure as claimed in claim 1, wherein:

said base portion has a plate-shaped configuration;

at least said inner part of said base portion is composed of an elastic material having an elasticity of solid rubber; and said seal wall is composed of an elastic material having an elasticity of sponge rubber.

3. A sealing structure as claimed in claim 1, wherein said base portion is secured to said outer body panel using one of clips and double-sided adhesive tapes.

4. The sealing structure of claim 1, wherein said base portion extends over and covers said flat joint.

5. The sealing structure of claim 1, wherein said base portion is secured to said door opening portion through said flat joint.

6. The sealing structure of claim 1, further comprising a cover lip extending from said base portion and covering an edge of said flat joint.

7. The sealing structure of claim 1, wherein said base portion extends to cover an edge of said flat joint.

* * * * *